United States Patent
Lee et al.

(10) Patent No.: US 7,065,362 B2
(45) Date of Patent: Jun. 20, 2006

(54) METHOD FOR PERFORMING A HANDOFF IN A MOBILE COMMUNICATION SYSTEM

(75) Inventors: Sung-Won Lee, Songnam-shi (KR); Young-Ky Kim, Seoul (KR); Dong-Soo Park, Seoul (KR); Dong-Jun Lee, Songnam-shi (KR); Sang-Soo Kim, Songnam-shi (KR); Jin-Sung Cho, Yongin-shi (KR)

(73) Assignee: Samsung Electronics Co., Ltd. (KR)

( * ) Notice: Subject to any disclaimer, the term of this patent is extended or adjusted under 35 U.S.C. 154(b) by 372 days.

(21) Appl. No.: 10/317,485

(22) Filed: Dec. 12, 2002

(65) Prior Publication Data

US 2003/0224786 A1    Dec. 4, 2003

(30) Foreign Application Priority Data

Dec. 12, 2001    (KR)    ...................... 10-2001-0078685

(51) Int. Cl.
*H04Q 7/20*    (2006.01)
(52) U.S. Cl. ...................... 455/442; 455/436; 455/438; 455/439; 455/440; 370/331; 370/394
(58) Field of Classification Search ................ 455/436, 455/437, 438, 439, 440, 442, 443; 370/331, 370/310.1, 310.2, 328, 338, 394
See application file for complete search history.

(56) References Cited

U.S. PATENT DOCUMENTS 6,466,556 B1 *  10/2002  Boudreaux .................. 370/331
6,757,270 B1 *   6/2004  Kumar et al. ................ 370/342
2001/0012279 A1 *   8/2001  Haumont et al. ............ 370/331
2001/0030953 A1 *  10/2001  Chang .......................... 370/331
2001/0036834 A1    11/2001  Das et al.

(Continued)

FOREIGN PATENT DOCUMENTS

EP    0 777 396 A1    6/1997

(Continued)

OTHER PUBLICATIONS

International Search Report dated Mar. 25, 2003, issued in a counterpart application, namely, Appln. No. PCT/KR02/02347.

(Continued)

*Primary Examiner*—Joseph Feild
*Assistant Examiner*—Huy D. Nguyen
(74) *Attorney, Agent, or Firm*—Dilworth & Barrese LLP

(57) ABSTRACT

A base station controller (BSC) performs a handoff of a mobile terminal (MT) moving between cells of base transceiver stations (BTSs) in a mobile communication system. If a target BTS is selected as a handoff candidate for the MT as the MT moves from a cell of a source BTS in service toward a cell of the target BTS, the BSC transmits to the target BTS a first message for requesting the target BTS to buffer packets, and transmits packets to be transmitted to the MT to both the source BTS and the target BTS. If the target BTS is determined as a serving BTS for the MT, the BSC transmits to the target BTS a second message including a last sequence number in order to request the target BTS to transmit, to the MT, packets with sequence numbers following the last sequence number of a last packet transmitted from the source BTS to the MT, among the buffered packets.

4 Claims, 24 Drawing Sheets

U.S. PATENT DOCUMENTS

2003/0207696 A1* 11/2003 Willenegger et al. ....... 455/522
2003/0210674 A1* 11/2003 Honkasalo et al. ......... 370/338

FOREIGN PATENT DOCUMENTS

| EP | 0 851 701 | 7/1998 |
| EP | 0 891 114 | 1/1999 |
| EP | 0 891 114 A1 | 1/1999 |
| KR | 1999-75134 | 10/1999 |
| KR | 2000-0041916 | 7/2000 |

OTHER PUBLICATIONS

European Search Report dated Nov. 5, 2003 issued in a counterpart application, namely, Appln. No. 02027685.3.

F. Tonbul et al., "Distributed Hand-Off Schemes for ATM-Based Beacon Type intelligent Vehicle Communication Systems", 1996 IEEE, pp. 1530-1534.

S. Seshan et al., "Handoffs in Cellular Wireless Networks: The Daedalus Implementation and Experience", Wireless Personal Communications, 4, pp. 141-162, 1997.

* cited by examiner

VSHO_Sequence_Retrieve MSG

| MSG TYPE | CODE | LENGTH |
|---|---|---|
| USER/FLOW-ID || |

FIG. 6
(PRIOR ART)

VSHO-Sequence-Notification MSG

| MSG TYPE | CODE | LENGTH |
|---|---|---|
| USER/FLOW-ID || |
| LAST-XMITED-RLP-SEQUENCE || |

FIG. 7
(PRIOR ART)

FVSHO_Suspend MSG

| MSG TYPE | CODE | LENGTH |
|----------|------|--------|
| USER/FLOW-ID ||  |

FIG. 12

FVSHO_Resume MSG

| MSG TYPE | CODE | LENGTH |
|----------|------|--------|
| USER/FLOW-ID |||
| RESUME_RLP_SEQUENCE |||

FIG. 20

FVSHO_Discard MSG

| MSG TYPE | CODE | LENGTH |
|---|---|---|
| USER/FLOW-ID ||| 
| DISCARD_TO_LAST_RLP_SEQUENCE |||

FIG. 23

METHOD FOR PERFORMING A HANDOFF IN A MOBILE COMMUNICATION SYSTEM

PRIORITY

This application claims priority to an application entitled "Method for Performing Handoff in a Mobile Communication System" filed in the Korean Industrial Property Office on Dec. 12, 2001 and assigned Serial No. 2001-78685, the contents of which are incorporated herein by reference.

BACKGROUND OF THE INVENTION

1. Field of the Invention

The present invention relates generally to a handoff method in a mobile communication system, and in particular, to a method for reducing a handoff time.

2. Description of the Related Art

FIG. 1 illustrates a network configuration of a conventional mobile communication system. This network configuration is commonly applied to IS (Interim Standard)-95A/B, GSM (Global System for Mobile Communications), IS-2000, WCDMA (Wideband Code Division Multiple Access), and UMTS (Universal Mobile Telecommunication Service) systems, although the names of the components may be different in each system.

Referring to FIG. 1, a mobile terminal (MT) 101 represents a mobile communication terminal. The mobile terminal 101 may serve as either a voice-based legacy terminal or an IP terminal supporting IP (Internet Protocol). A base transceiver station (BTS) 102 manages radio resources, and actually exchanges data packets and control information with the mobile terminal 101 located in its service area (or cell) over a radio link. A base station controller (BSC) 103, which controls BTSs 102-A and 102-B, supports a signaling protocol for call setup and release. A GW/MSC (Gateway/Mobile Switching Center) 105, which connects its own network to a mobile communication network, the Internet, a PSTN (Public Switched Telephone Network) and a PSDN (Public Switched Data Network), supports protocol translation between different networks. As a logical name, the gateway GW can be called a PDSN (Packet Data Service Node), an AGW (Access Gateway) or an MGW (Media Gateway).

In the mobile communication network configuration, a link between the BSC/BTS 103/102 and the GW/MSC 105 can be formed with either a circuit network constructed using a leased line such as E1/T1 like the existing mobile communication network, or an IP packet network constructed using an IP router. In the former case, the BSC 103 is connected to the BTSs 102-A and 102-B with E1/T1, and IP is used as an upper transmission layer. In the latter case, the BSC 103 and the BTSs 102-A and 102-B are separately connected to an IP network through, for example, a router, instead of being directly connected.

FIG. 2 illustrates a detailed structure of the BSC 103 illustrated in FIG. 1. Referring to FIG. 1, a BSC main controller 213 manages resources of the BSC 103 and partial resources of the BTSs 102-A and 102-B, and controls the overall operation of the BSC 103. A first interface 223 interfaces a signal between the GW 105 and the BSC 103. An intra-BSC switch 233 is a router for managing routing and switching functions within the BSC 103. A second interface 243 interfaces a signal between the BSC 103 and the BTS 102-A and 102-B. Here, the first interface 223 and the second interface 243 each use NIC (Network Interface Card) or LIC (Line Interface Card) for connection with the GW 105 and the BTSs 102-A and 102-B, respectively. An SDU/RLP (Service Data Unit/Radio Link Protocol) processor 253 exchanges traffic with the mobile terminal 101. Here, an SDU is a given data unit distinguished by the service type, and an RLP is a protocol for radio transmission of data. A data packet transmitted by the RLP is called an "RLP packet."

FIG. 3 illustrates a detailed structure of the BTSs 102-A and 102-B shown in FIG. 1. Both 102-A and 102-B have the same structure. Therefore, only a description of BTS 102-A will be given herein below.

Referring to FIG. 3, a BTS main controller 312 manages wire/wireless resources of the BTS 102-A, and controls the overall operation of the BTS 102-A. A first interface 322 interfaces a signal between the BSC 103 and the BTS 102-A. An intra-BTS switch 332 is a router for managing routing and switching functions within the BTS 102-A. An RF (Radio Frequency) scheduler 342 is a processor for scheduling packet transmission in order to efficiently use radio resources in the BTS 102-A. The RF scheduler 342 can be realized with either a separate board or a part of channel cards 352-1 to 352-N. The channel cards 352-1 to 352-N, together with the SDU/RLP processor 253 in the BSC 103, code and spread data transmitted to the mobile MT 101, or despread and decode a signal received from the MT 101. An RF device 362 up-converts baseband signals from the channel cards 352-1 to 352-N and provides its output to the MT 101, or down-converts an RF signal received from the MT 101 and provides its output to a corresponding channel card.

Such a mobile communication system divides its entire service area into a plurality of cells, and services the individual cells using a plurality of BTSs. In an actual radio environment, the cells partially overlap with one another, and in the overlapping region, a mobile terminal may receive signals from two or more BTSs. In such a cellular mobile communication system, in order to maintain a call of a mobile terminal moving between cells, a handoff procedure for exchanging call control signals between BTSs is required. The handoff is performed by a BSC that controls the BTSs. A conventional handoff procedure performed in the mobile communication system will be described herein below.

FIG. 4 illustrates a conventional handoff procedure according to the prior art. In FIG. 4, a handoff occurs when an MT in communication with a serving BTS#1 moves into a cell of another BTS#2. In this case, BTS#1 is called a source BTS, and BTS#2 is called a target BTS. In step 401, the MT is located in a service area, or a cell, of the source BTS, and a BSC controls only a communication path between the source BTS and the MT. The BSC transmits data traffic for the MT only to the source BTS. In step 403, RLP packets from the BSC are transmitted to the MT through the source BTS. Sequence numbers of the RLP packets are shown in brackets.

As the MT moves and enters a service area, or a cell, of the target BTS, the MT may receive a signal from the target BTS. Then, in step 405, the target BTS is registered as a candidate member of an active set for the MT. Even in this process, RLP packets from the BSC are transmitted to the MT through the source BTS, in step 407.

When the MT gets closer to the target BTS, a signal received from the target BTS becomes higher than a predetermined handoff threshold. Then, in step 409, the MT is handed off from the source BTS to the target BTS under the control of the BSC. As a result, in step 411, RLP packets from the BSC are transmitted to the MT through the target BTS.

In step 413, as the MT moves away from the source BTS, the BSC drops the source BTS from a handoff candidate set for the MT. In step 415, the BSC transmits RLP packets only to the target BTS. Then, in step 417, the MT receives RLP packets transmitted from the BSC through the target BTS.

FIG. 5 illustrates a detailed description of that procedure performed in step 409 of FIG. 4. In step 409, an MT switches a serving BTS from a source BTS to a target BTS. The BSC may detect that the MT switches a serving BTS from a source BTS to a target BTS (i.e., a handoff occurs), either through the BTSs or by itself. It is assumed in FIG. 5 that the BSC detects the occurrence of a handoff by itself. In step 501, the BSC transmits to the source BTS a sequence retrieve message VSHO(Virtual Soft Hand-Off)_Sequence_Retrieve MSG for retrieving a sequence number (i.e., the last sequence number) of an RLP packet that was last transmitted to the MT. In response to the message, the source BTS transmits to the BSC a sequence notification message VSHO_Sequence_Notification MSG for notifying the sequence number of the RLP packet that was last transmitted to the UE in step 503.

Referring to FIG. 4, when the target BTS (BTS#2) was registered as a candidate BTS, the source BTS (BTS#1) has previously received RLP packets with sequence numbers of 7, 8, and 9 from the BSC, and transmitted only the RLP packet with the sequence number of 7 to the MT. At the request of the BSC, the source BTS (BTS#1) notifies the BSC that the sequence number of the RLP packet that was last transmitted to the MT is 7. After a handoff is performed, the BSC transmits RLP packets with sequence numbers of 8 or larger, to the MT through the target BTS (BTS#2).

If the BSC is notified through the BTSs that the MT has been handed off, the source BTS may transmit the message VSHO_Sequence_Notification MSG for notifying the sequence number of the last transmitted RLP packet to the BSC.

A format of the sequence retrieve message VSHO_Sequence_Retrieve MSG transmitted from the BSC to the source BTS is illustrated in FIG. 6. As illustrated, the sequence retrieve message includes an MSG_TYPE field indicating the type of message, a CODE field including a control code, a LENGTH field indicating a length of the message, and a USER/FLOW-ID field for identifying a user or data flow.

In addition, a format of the sequence notification message VSHO_Sequence_Notification MSG transmitted from the source BTS to the BSC as a response message is illustrated in FIG. 7. As illustrated, the sequence notification message includes an MSG_TYPE field indicating the type of message, a CODE field including a control code, a LENGTH field indicating a length of the message, a USER/FLOW-ID field for identifying a user or data flow, and a LAST-XMITED-RLP-SEQUENCE field indicating a sequence number of an RLP packet that was last transmitted to the MT.

FIG. 8 is a flowchart illustrating a conventional handoff procedure performed by the BSC according to the prior art. Referring to FIG. 8, the BSC waits for a handoff in step 801, and determines whether a handoff occurs in step 803. If a handoff does not occur, the BSC returns to step 801 and waits for occurrence of a handoff. Otherwise, if a handoff occurs, the BSC transmits a sequence retrieve message VSHO_Sequence_Retrieve MSG for retrieving a sequence number (i.e., the last sequence number) of an RLP packet that was last transmitted to the MT, to the source BTS in step 805. Thereafter, the BSC waits for a response to the transmitted message in step 807, and determines in step 809 whether a response message is received from the source BTS. Upon receiving a response message VSHO_Sequence_Notification MSG, the BSC forwards RLP packets with the last sequence number and its succeeding sequence numbers, to the target BTS in step 811. The target BTS then forwards the next packets provided by the BSC to the MT.

FIG. 9 is a flowchart illustrating a conventional handoff procedure performed by the source BTS according to the prior art. Referring to FIG. 9, the source BTS waits for a sequence retrieve message VSHO_Sequence_Retrieve MSG for retrieving a sequence number (i.e., the last sequence number) of the last transmitted RLP packet, from the BSC in step 901, and determines whether the sequence retrieve message is received in step 903. If the sequence retrieve message is received, the source BTS retrieves the last sequence number from a predetermined memory area, in step 905. Thereafter, in step 907, the source BTS transmits a sequence notification message VSHO_Sequence_Notification MSG with the retrieved last sequence number to the BSC.

The steps 901 and 903 of FIG. 9 are performed when the BSC detects a handoff of the MT by itself. As another example, the source BTS may personally notify the BSC of the last sequence number. In this case, the steps 901 and 903 are unnecessary. That is, if the source BTS receives a handoff request from the BSC or detects by itself that the MT enters a handoff region, then the source BTS notifies the BSC of a sequence number of the RLP that was last transmitted form the source BTS to the MT.

As described above, in the prior art, a handoff delay is generated by performing an handoff by MT, detecting an occurrence of the handoff by a BSC, notifying the BSC of a sequence number of the last RLP packet transmitted from a source BTS to the MT, transmitting a new RLP packet to a target BTS by the BSC based on the notified sequence number, and resuming a call with the MT by the target BTS. As a result, an RLP exchange between the MT and the BSC is suspended during the process stated above.

In the future mobile communication system, an MT will rapidly select a BTS having a good radio environment. In this case, the handoff delay may disturb a normal call. For example, while a BSC performs the handoff procedure as an MT moves from a BTS_A to a BTS_B, the MT may move again from the BTS_B to another BTS_C. In this case, continuous call congestion may occur, causing call interruption between the MT and the BSC. In particular, because it is very important for the future mobile communication system to secure QoS (Quality of Service), there is a demand for a new technique for reducing a handoff time and increasing QoS during a handoff.

SUMMARY OF THE INVENTION

It is, therefore, an object of the present invention to provide a method for previously transmitting data traffic from BSC to a handoff candidate BTS before a handoff occurs, in a mobile communication system.

To achieve the above and other objects, the present invention provides a method for performing a handoff of a mobile terminal (MT) moving between cells of base transceiver stations (BTSs) by a base station controller (BSC) in a mobile communication system including a plurality of BTSs covering associated cells, and the BSC for controlling the BTSs. The method comprises the steps of: if a target BTS is selected as a handoff candidate for the MT as the MT moves from a cell of a source BTS in service toward a cell of the target BTS adjacent to the source BTS, transmitting to the target BTS a first message, requesting the target BTS to buffer packets; transmitting packets to be transmitted to the MT to both the source BTS and the target BTS; and if the target BTS is determined as a serving BTS for the MT, transmitting to the target BTS a second message including a last sequence number in order to request the target BTS to transmit, to the MT, packets with sequence numbers following the last sequence number of a packet last transmitted from the source BTS to the MT, among the buffered packets.

To achieve the above and other objects, the present invention provides a method for performing a handoff of a mobile terminal (MT) by a target base transceiver station (BTS) as the MT moves from a cell of a source BTS in service to a cell of an adjacent target BTS in a mobile communication system including a plurality of BTSs covering associated cells and the BSC for controlling the BTSs. The method comprises the steps of: if the target BTS is selected as a handoff candidate for the MT, receiving a first message from the BSC, requesting the target BTS to buffer packets; buffering packets received from the BSC, in response to the first message; if the target BTS is selected as a serving BTS for the MT, receiving from the BSC a second message including a last sequence number of a packet last transmitted from the source BTS to the MT; and discarding, in response to the second message, packets with sequence numbers below the last sequence number included in the second message among the buffered packets, and transmitting next packets to the MT.

To achieve the above and other objects, the present invention provides a method for performing a handoff of a mobile terminal (MT) moving between cells of base transceiver stations (BTSs) in a mobile communication system including a plurality of BTSs covering associated cells, and a base station controller (BSC) for controlling the BTSs. The method comprises the steps of: if a target BTS is selected as a handoff candidate for the MT as the MT moves from a cell of a source BTS in service toward the target BTS adjacent to the source BTS, transmitting from the BSC to the target BTS a first message for requesting buffering of packets, and transmitting packets to be transmitting to the MT to both the source BTS and the target BTS; upon receiving the first message, buffering by the target BTS packets received from the BSC; if the target BTS is determined as a serving BTS for the MT, transmitting from the BSC a second message for retrieving a last sequence number of a packet last transmitted to the MT, to the source BTS; transmitting from the source BTS a third message including the last sequence number to the BSC, in response to the second message; transmitting by the BSC a fourth message including the last sequence number acquired from the third message, to the target BTS; and discarding in the target BTS packets with sequence numbers below the last sequence number among the buffered packets in response to the fourth message, and transmitting next packets to the MT.

BRIEF DESCRIPTION OF THE DRAWINGS

The above and other objects, features, and advantages of the present invention will become more apparent from the following detailed description when taken in conjunction with the accompanying drawings in which:

FIG. 6 illustrates a format of a sequence retrieve message transmitted from the BSC to the source BTS;

FIG. 7 illustrates a format of a sequence notification message transmitted from the source BTS to the BSC;

FIG. 12 illustrates a format of a transmission suspended message transmitted from the BSC to the target BTS;

FIG. 20 illustrates a format of a resumption message transmitted from the BSC to the target BTS;

FIG. 23 illustrates a format of a discard message transmitted from the BSC to the dropped candidate BTS;

DETAILED DESCRIPTION OF THE PREFERRED EMBODIMENT

Preferred embodiments of the present invention will be described herein below with reference to the accompanying drawings. In the following description, well-known functions or constructions are not described in detail since they would obscure the invention in unnecessary detail.

The present invention provides a method for reducing a handoff process time by previously transmitting data traffic to a handoff candidate BTS when it is expected that a handoff will occur, in a mobile communication system.

Figure 1:
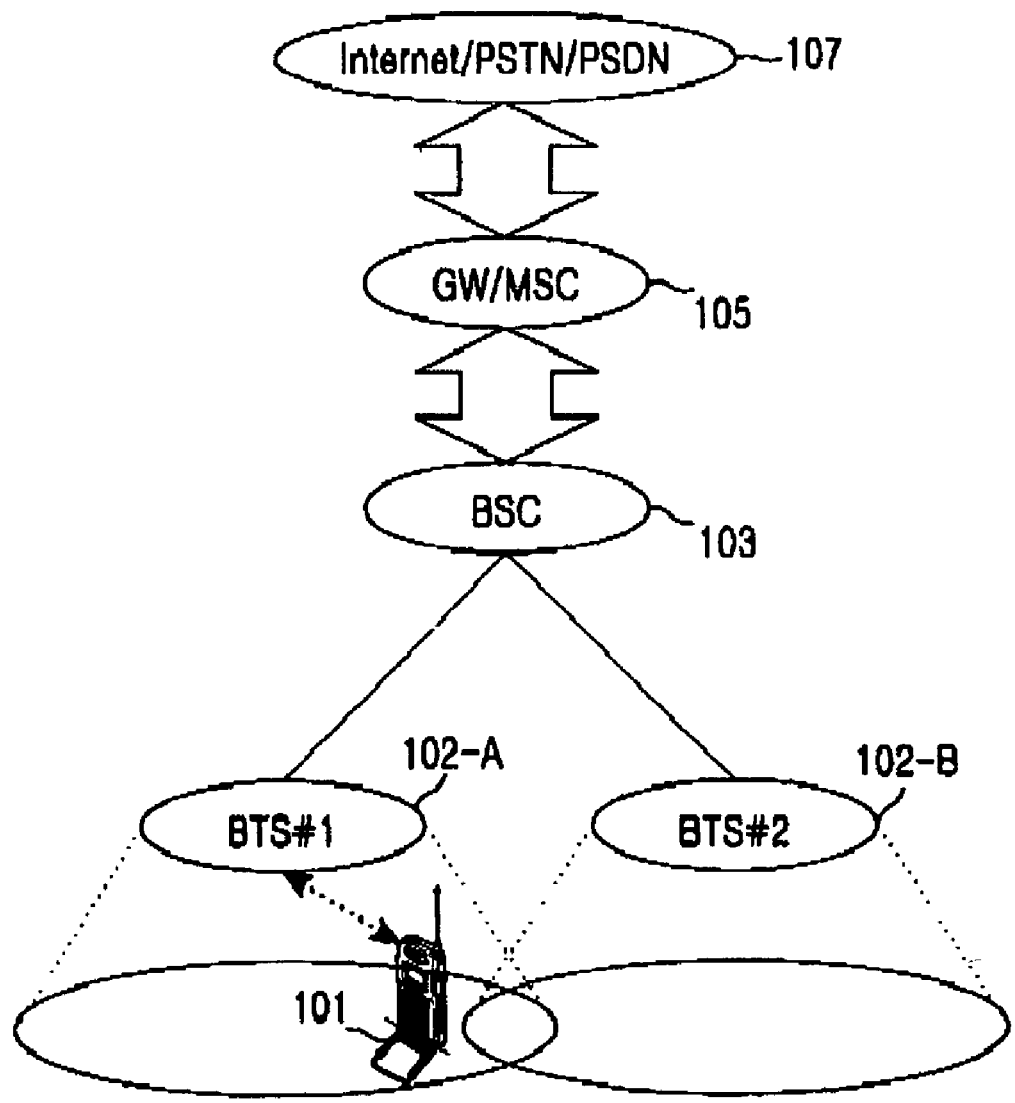
FIG. 1 illustrates a network configuration of a conventional mobile communication system.
Figure 2:
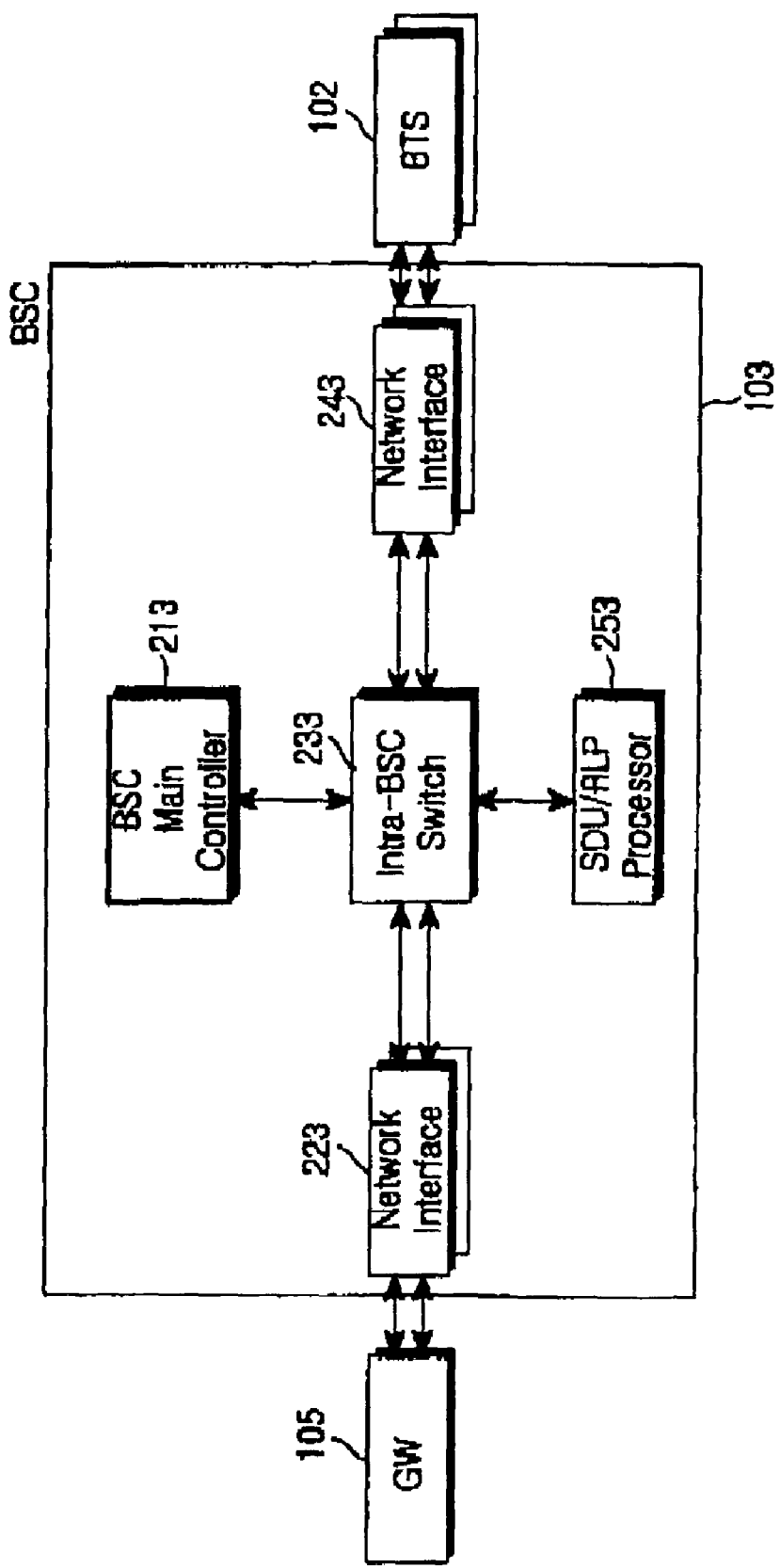
FIG. 2 illustrates a detailed structure of the BSC shown in FIG. 1.
Figure 3:
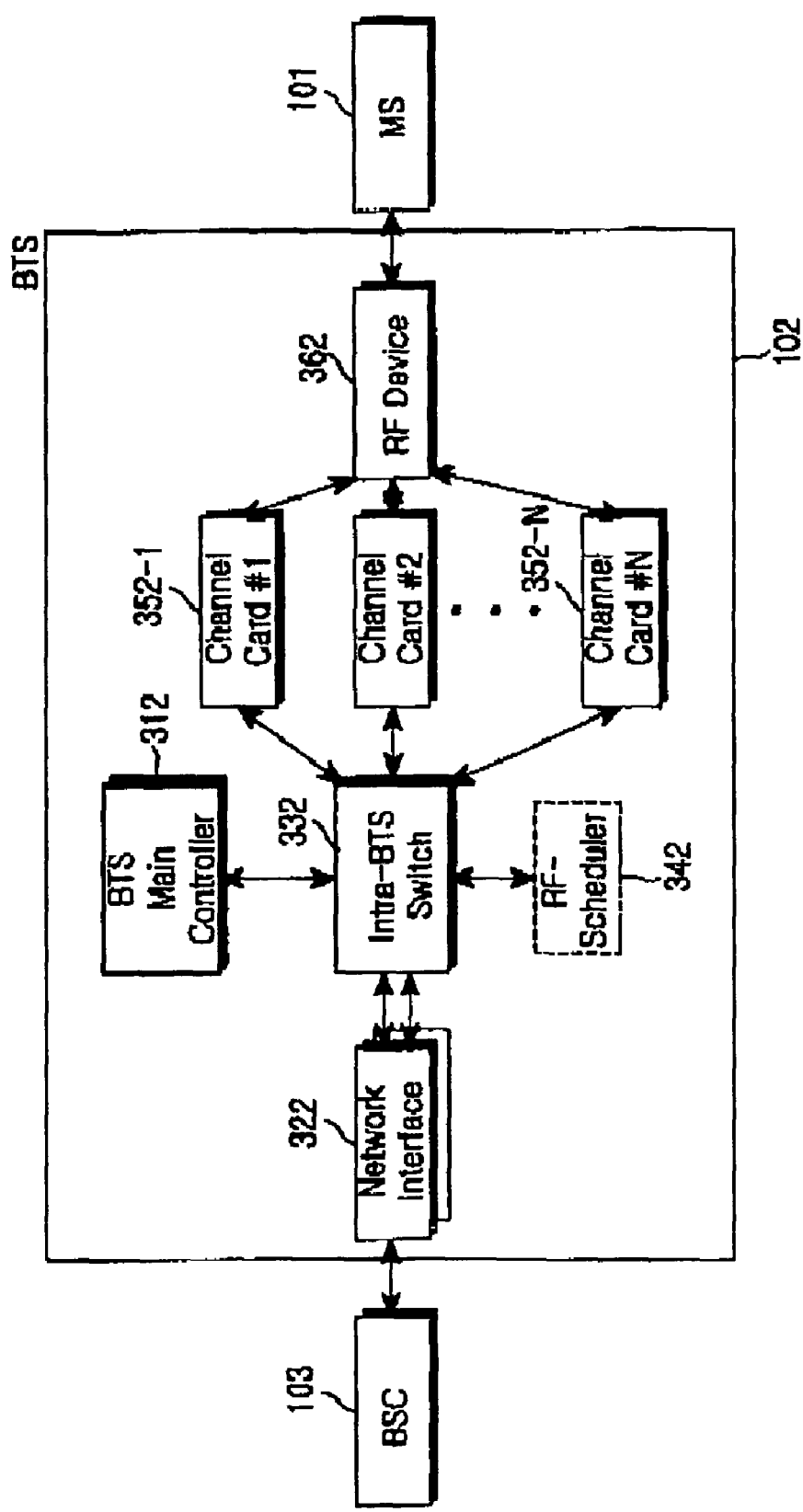
FIG. 3 illustrates a detailed structure of the BTS shown in FIG. 1.
Figure 4:
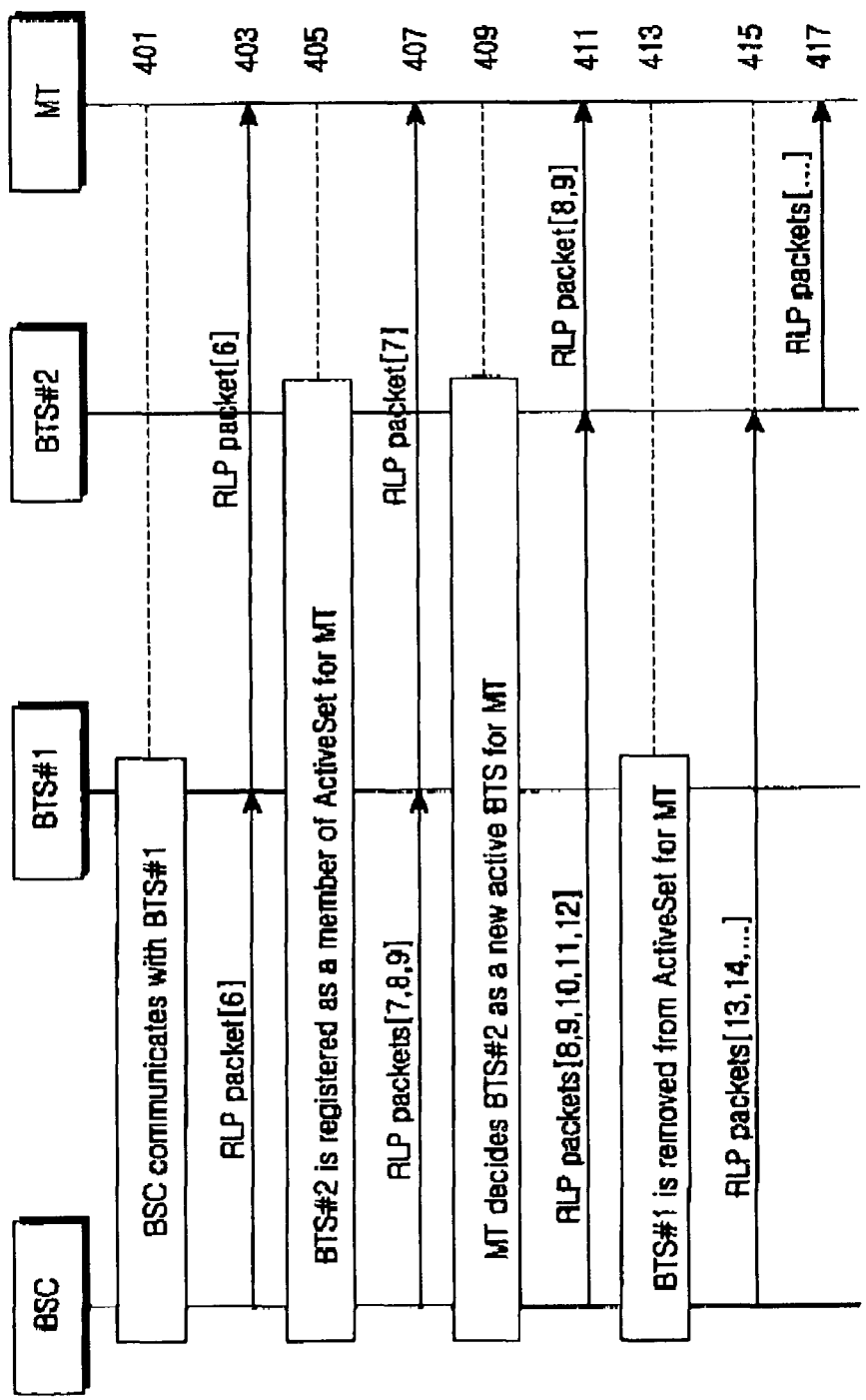
FIG. 4 illustrates a handoff procedure according to the prior art.
Figure 5:
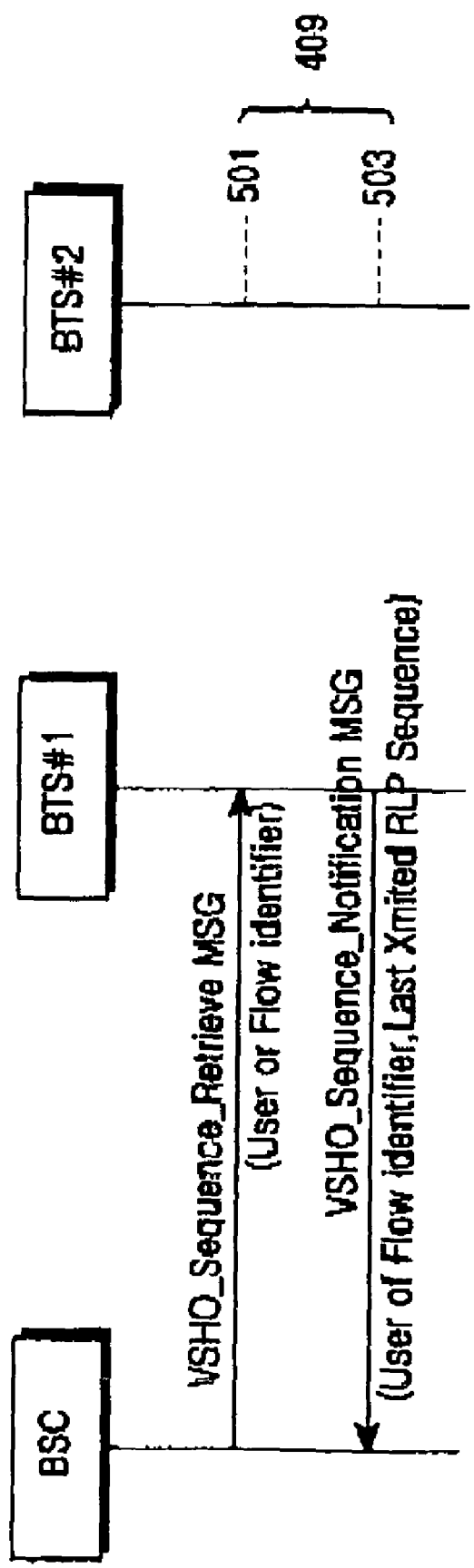
FIG. 5 illustrates a detailed description of the procedure performed in step 409 of FIG. 4.
Figure 8:
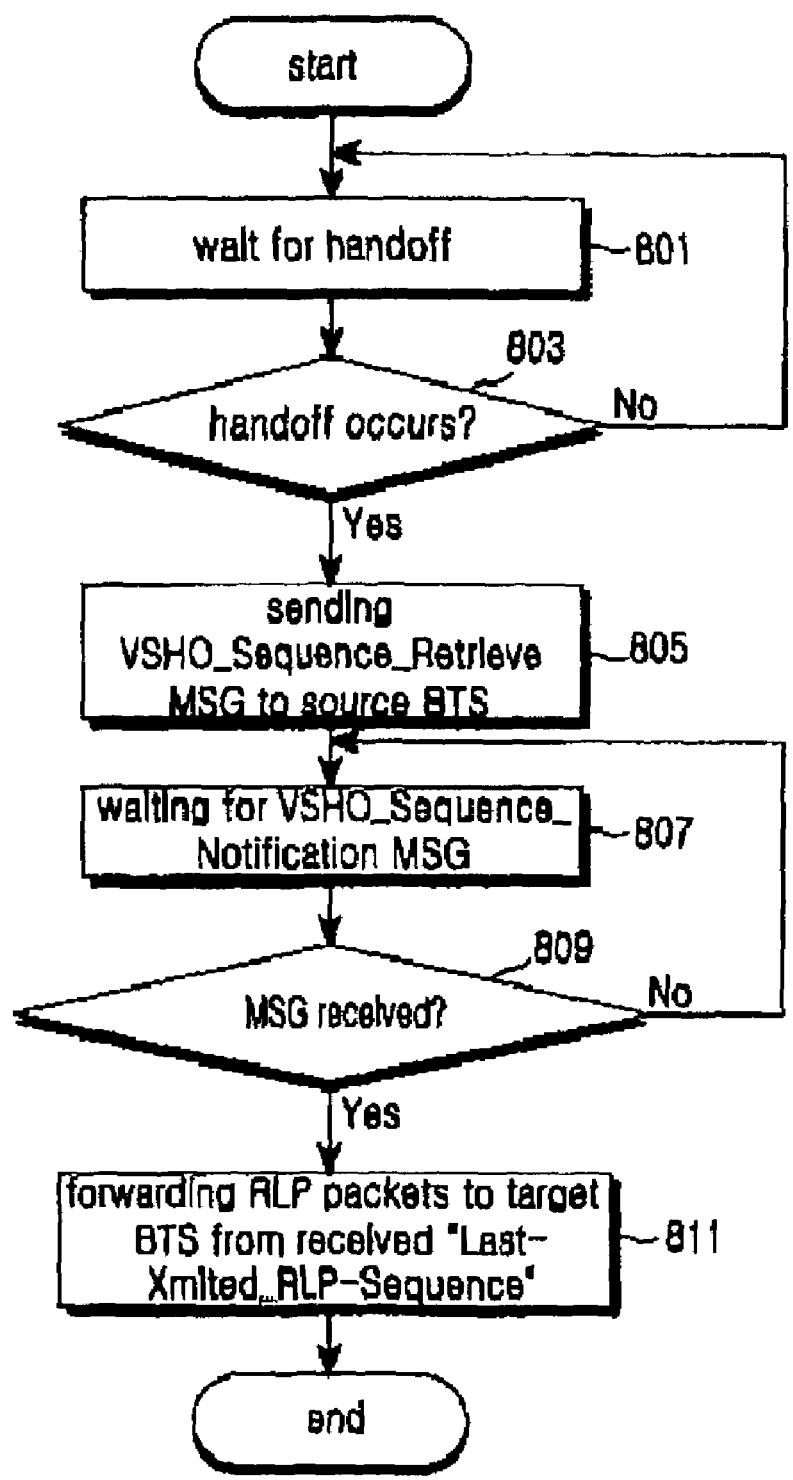
FIG. 8 is a flowchart illustrating a handoff procedure performed by the BSC according to the prior art.
Figure 9:
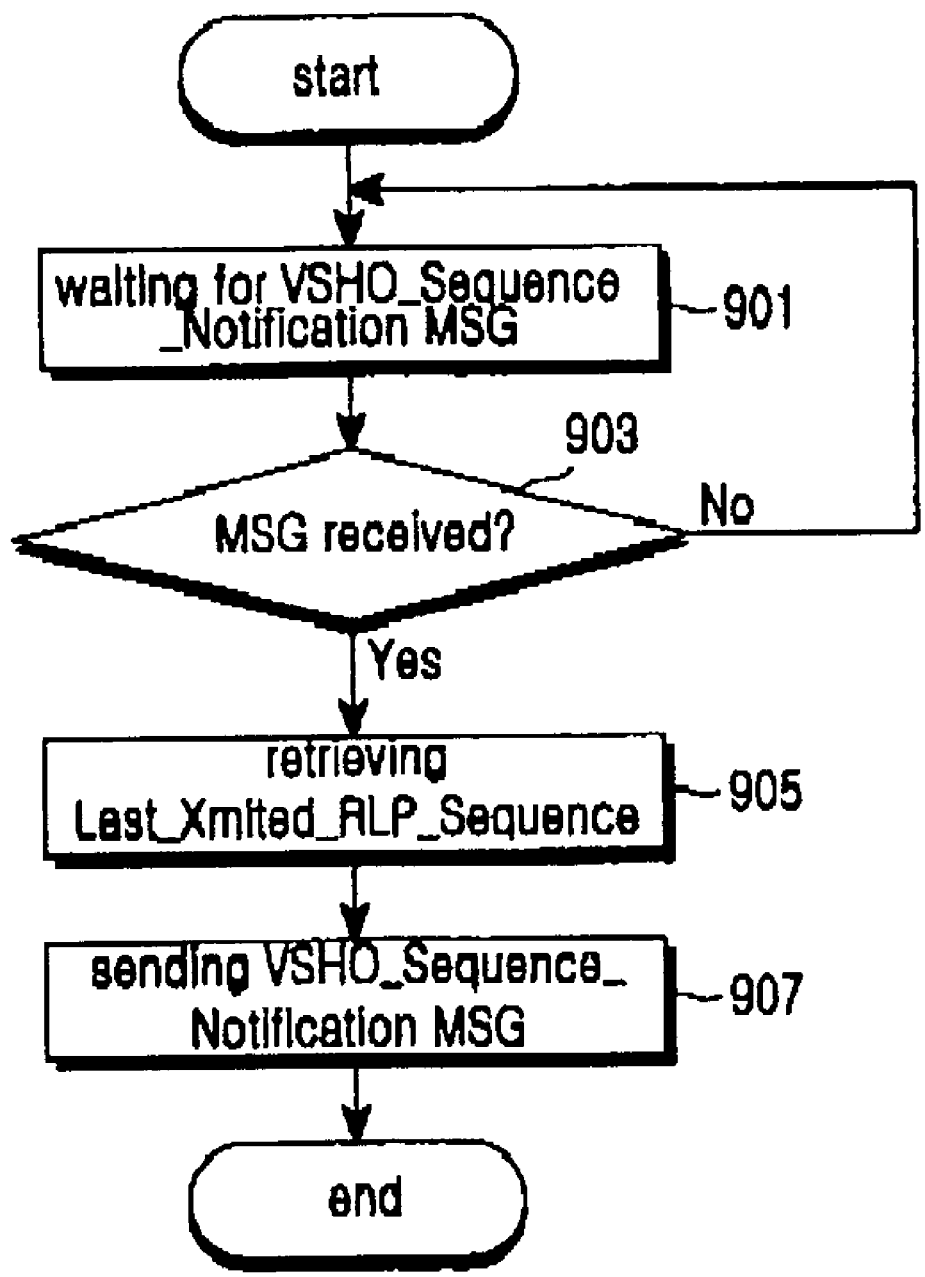
FIG. 9 is a flowchart illustrating a handoff procedure performed by the source BTS according to the prior art.

A network configuration of a mobile communication system, a structure of BSC, and a structure of BTS, to which the present invention is applied, are identical to those described in conjunction with FIGS. 1 to 3. The present invention will provide a handoff procedure performed by a BSC and a BTS. In addition, a definition will be given of new messages proposed by the present invention.

As is well known, a cellular mobile communication system manages a BTS list, known as an "active set" or a "candidate set" for each MT in order to control a call in an MT moving between cells, which may overlap with each other. The active set includes one or more active BTSs servicing the corresponding MT, and the candidate set includes candidate BTSs that are not included but to be included in the active set. If an MT first detects a signal from a particular BTS, the BTS becomes a candidate BTS under the control of the BSC, and if a level of the signal from the BTS is higher than a predetermined handoff threshold, the BTS becomes an active BTS under the control of the BSC.

As a result, the BSC according to the present invention transmits the same data traffic (to be transmitted to the MT) to all BTSs selected as candidate BTSs including the active BTS, so that the BSC can continuously transmit data to the MT without retransmitting the last transmitted data traffic to BTS selected as an active BTS after the handoff is ended.

Figure 10:
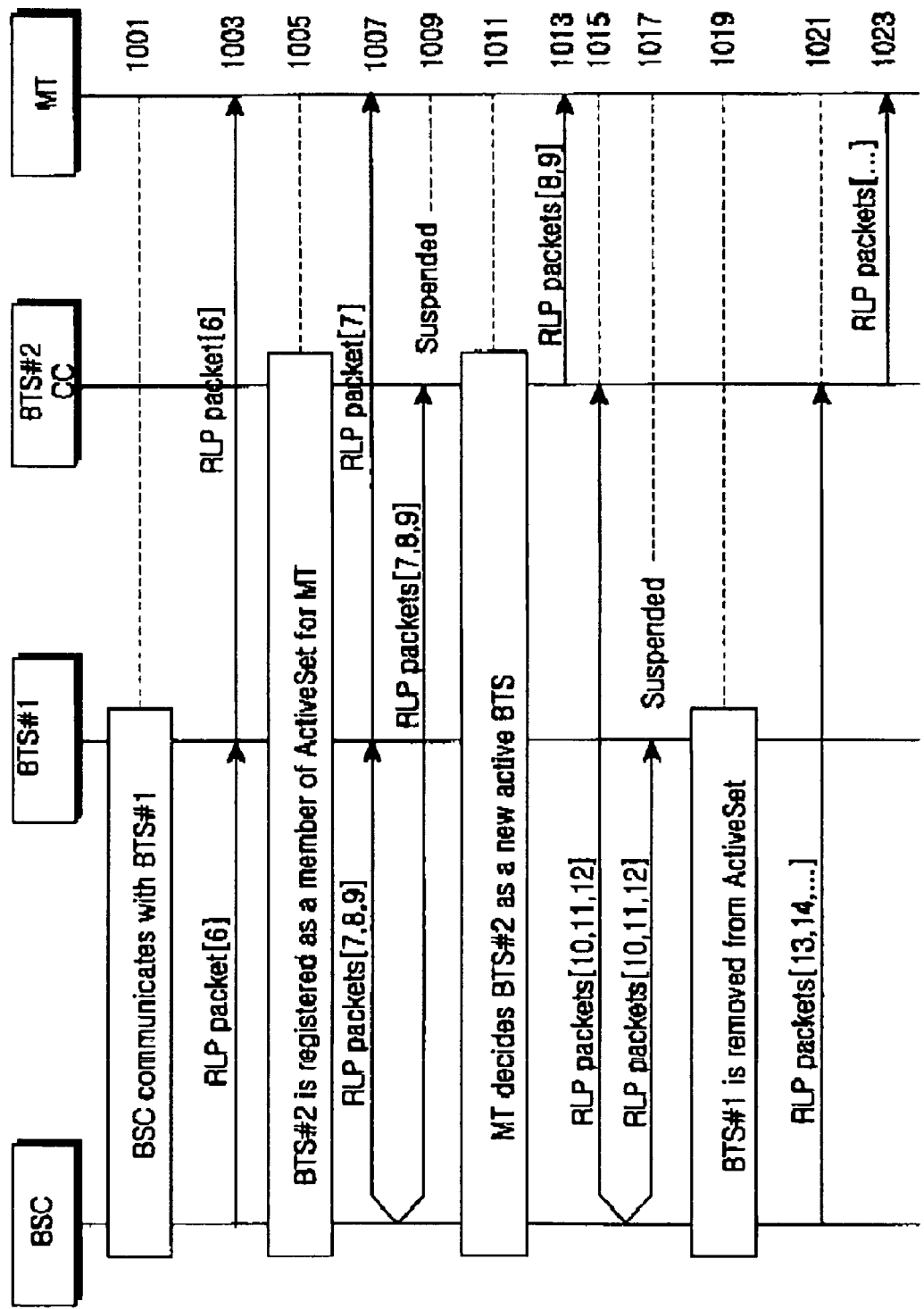
FIG. 10 illustrates a handoff procedure according to an embodiment of the present invention.

FIG. 10 illustrates a handoff procedure according to an embodiment of the present invention. In FIG. 10, a handoff occurs, as an MT in communication with a serving BTS#1 moves toward another BTS#2. In this case, the BTS#1 is called a source BTS, and the BTS#2 is called a target BTS.

Referring to FIG. 10, in step 1001, the MT is located in a service area, or a cell, of the source BTS, and the BSC controls only a communication path between the source BTS and the MT. In this case, the BSC transmits data traffic for the MT only through the source BTS. In step 1003, data packets from the BSC are transmitted to the MT through the source BTS. Sequence numbers of the data packets are shown in brackets.

As the MT moves and enters a service area of the target BTS, the MT may receive a signal from the target BTS. Then, in step 1005, the target BTS is registered as a candidate of an active set for the MT. That is, the target BTS is taken into consideration as a handoff candidate for the MT. In step 1007, the BSC transmits data packets to be transmitted to the MT through the source BTS. In step 1009, the BSC transmits the same data packets as the data packets transmitted to the source BTS to the target BTS registered as a candidate for the MT. Since the target BTS is not connected to the MT over a radio channel, the target BTS merely buffers the data packets received from the BSC and does not transmit the received data packets to the MT.

If the MT gets closer to the target BTS, a signal received from the target BTS becomes higher than a predetermined handoff threshold. Then, in step 1011, the MT is handed off from the source BTS to the target BTS under the control of the BSC. That is, the target BTS is registered as an active BTS, and connected to the MT over a radio channel. At this point, the source BTS releases a radio channel connected to the MT, and becomes a candidate BTS. As a result, in step 1013, the target BTS transmits the buffered packets to the MT over the radio channel. Subsequently, the target BTS transmits, to the MT, data packets with sequence numbers following the last sequence number transmitted by the source BTS through a sequence equalizer with the source BTS.

Thereafter, in step 1015, the BSC transmits the next (or succeeding) data packets to the target BTS. In step 1017, the BSC transmits, to the source BTS, the same packets as the data packets transmitted to the target BTS. This is because the source BTS is registered as a handoff candidate for the MT. Since the source BTS is not connected to the MT over a radio channel, and the source BTS merely buffers the data packets received from the BSC and does not transmit the received data packets.

In step 1019, as the MT moves away from the source BTS, the BSC drops the source BTS from a handoff candidate set for the MT. As a result, in step 1021, the BSC transmits data packets only to the target BTS. Then, in step 1023, the MT receives data packets transmitted from the BSC through the target BTS.

Figure 11:
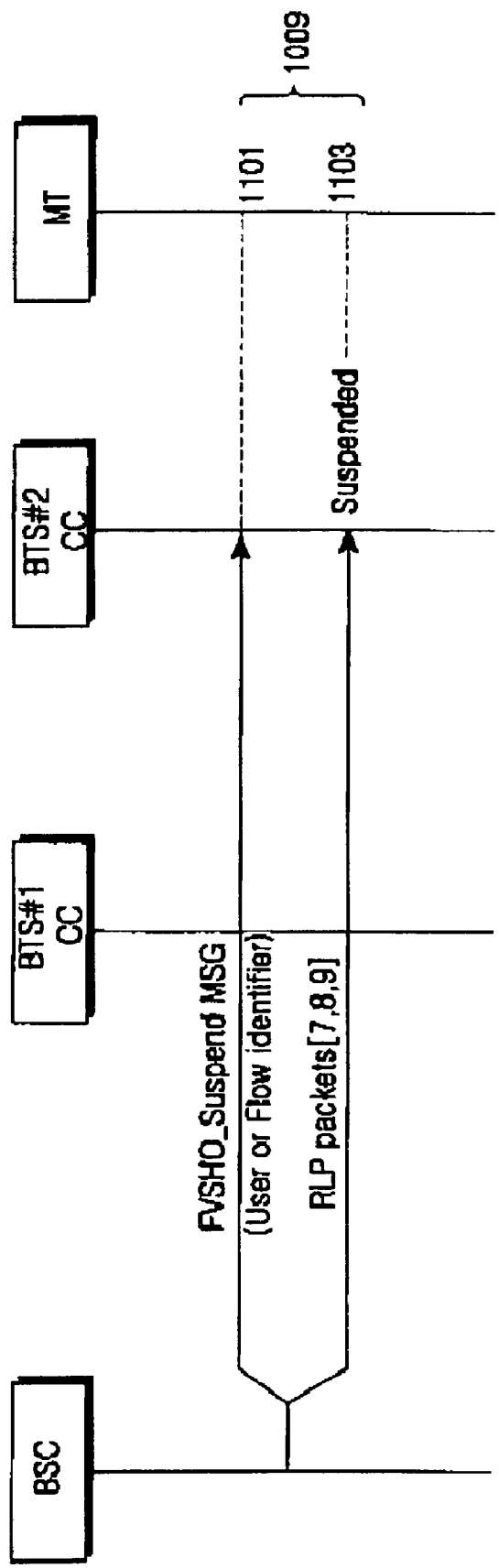
FIG. 11 illustrates a detailed description of the procedure performed in step 1009 of FIG. 10.

FIG. 11 illustrates a detailed description of the procedure performed in step 1009 of FIG. 10. In step 1009, a BSC transmits the same data packets as the data packets transmitted to the source BTS to the target BTS registered as a handoff candidate. In step 1101, the BSC transmits a transmission suspended message, FVSHO (Fast VSHO)_Suspend MSG for requesting suspension of transmitting data packets over a radio channel, while transmitting the data packets to the target BTS registered as a handoff candidate for the MT. In step 1103, the BSC transmits, to the target BTS, the next data packets with sequence numbers following the last sequence number reported periodically or non-periodically by the source BTS. As a result, the BSC transmits to the target BTS the same data packets as the data packets transmitted to the source BTS.

A format of the transmission suspended message is illustrated in FIG. 12. As illustrated, the transmission suspended message includes an MSG_TYPE field indicating the type of the message, a CODE field including a control code, a LENGTH field indicating a length of the message, and a USER/FLOW-ID field for identifying a user or data flow.

Figure 13:
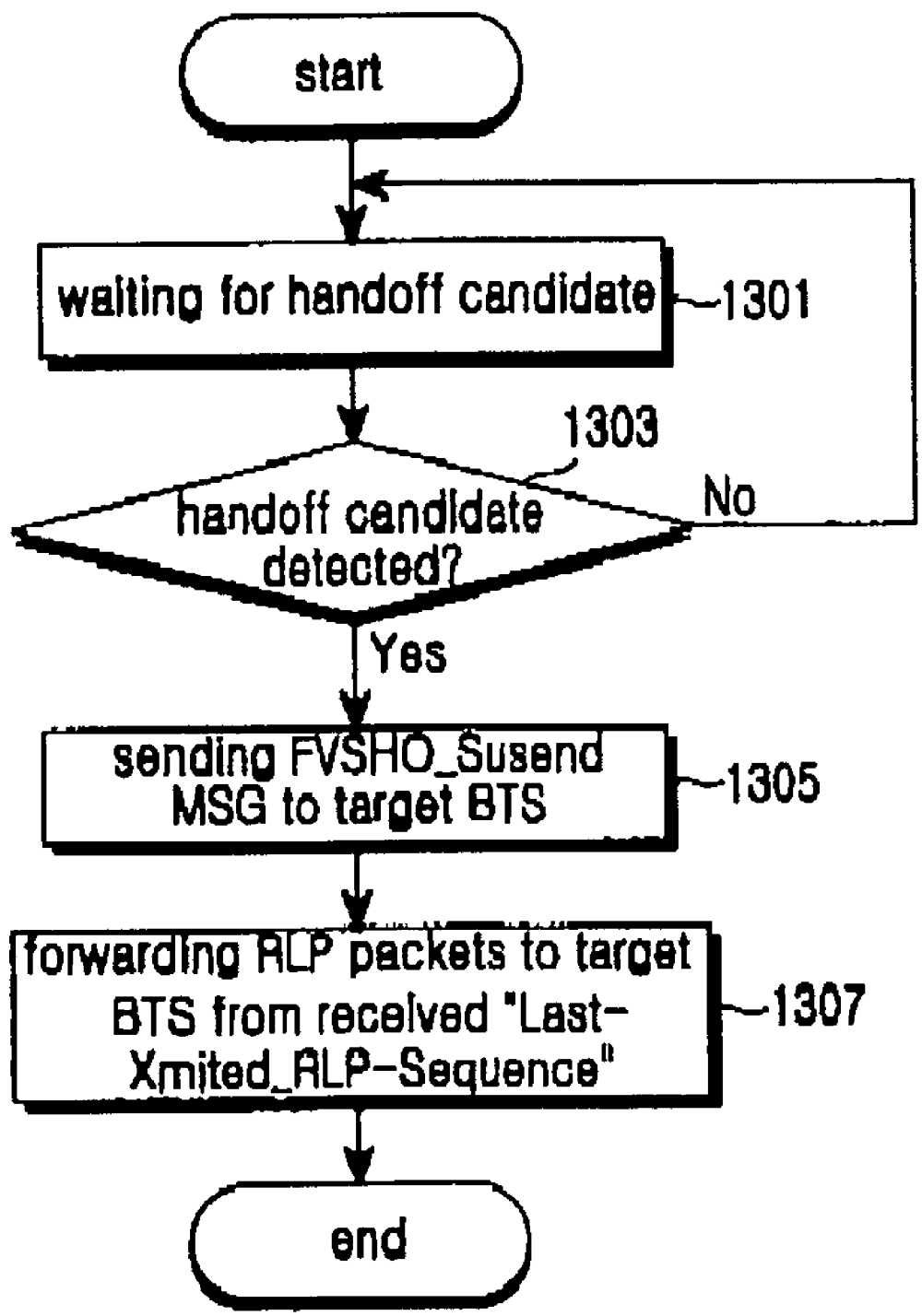
FIG. 13 is a flowchart illustrating a handoff procedure performed by the BSC according to an embodiment of the present invention.

FIG. 13 is a flowchart illustrating a handoff procedure performed by the BSC according to an embodiment of the present invention. Referring to FIG. 13, the BSC waits for a handoff candidate in step 1301, and determines in step 1303 whether a handoff candidate is detected, i.e., whether the MT detects a target BTS instead of the source BTS in service as a handoff candidate. The BSC transmits a transmission suspended message, FVSHO_Suspend MSG for requesting the target BTS to buffer data packets transmitted from now on in step 1305. In step 1307, the BSC transmits to the target BTS the same data packets as the data packets transmitted to the source BTS.

Figure 14:
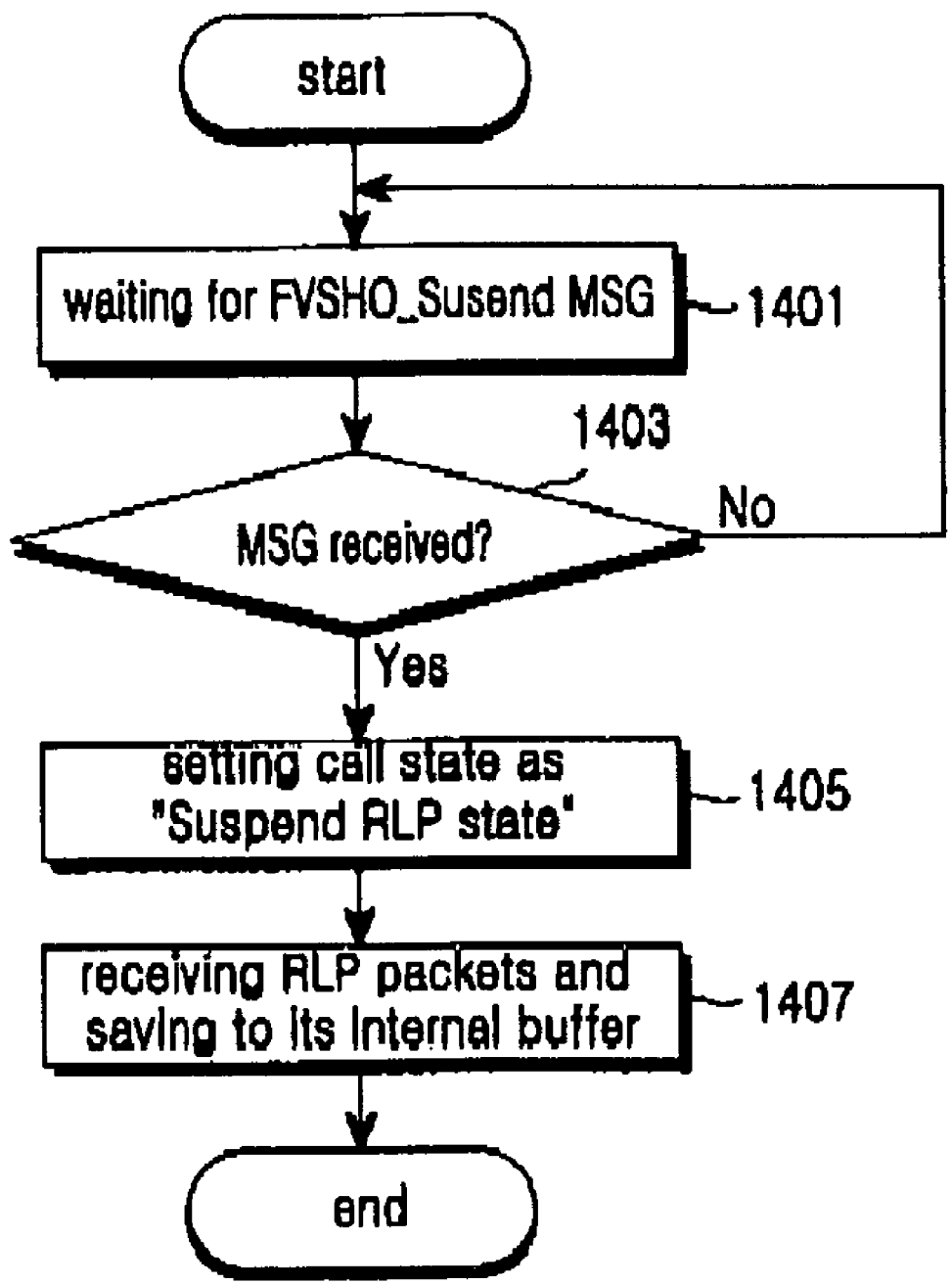
FIG. 14 is a flowchart illustrating a handoff procedure performed by the target BTS according to an embodiment of the present invention.

FIG. 14 is a flowchart illustrating a handoff procedure performed by the target BTS according to an embodiment of the present invention. Referring to FIG. 14, the target BTS waits for the transmission suspended message FVSHO_Suspend MSG in step 1401, and determines in step 1403 whether the transmission suspended message is received. If the transmission suspended message is received, the target BTS defines a state where it is connected to the corresponding MT, as a "suspend RLP state" in step 1405. Thereafter, in step 1407, the target BTS stores RLP packets for the corresponding MT, received from the BSC, in its internal buffer. The target BTS buffers the RLP packets until a transmission resumption request is received from the BSC.

Figure 15:
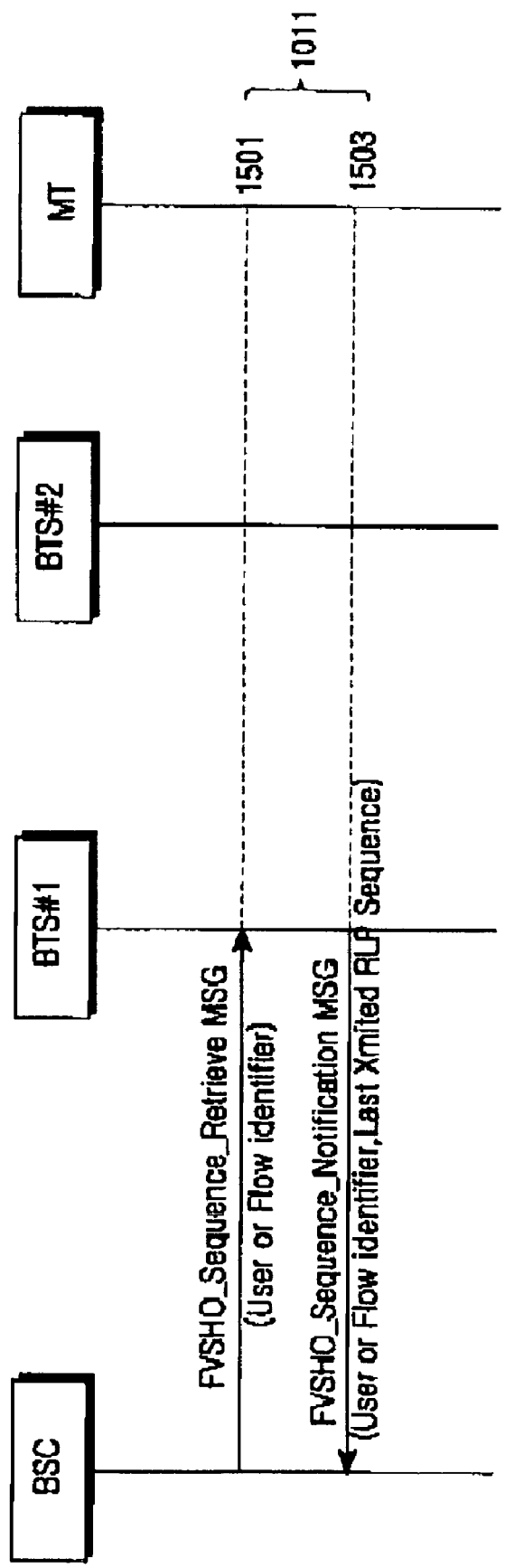
FIG. 15 illustrates a detailed description of the procedure performed in step 1011 of FIG. 10.

FIG. 15 illustrates a detailed description of the procedure performed in step 1011 of FIG. 10. In step 1011 an MT switches a serving BTS from a source BTS to a target BTS.

Referring to FIG. 15, the BSC may detect that the MT switches a serving BTS from a source BTS to a target BTS (i.e., a handoff occurs), either through the BTSs or by itself. It is assumed in FIG. 15 that the BSC detects the occurrence of a handoff by itself. In step 1501, the BSC transmits to the source BTS a sequence retrieve message, FVSHO_Sequence_Retrieve MSG for retrieving a sequence number (i.e., the last sequence number) of an RLP packet that was last transmitted to the MT. In response to the sequence retrieve message, the source BTS transmits to the BSC a sequence notification message FVSHO_Sequence_Notification MSG for notifying the sequence number of the RLP packet that was last transmitted to the MT in step 1503.

Referring to FIG. 10, when the target BTS (BTS#2) was registered as a candidate BTS, the source BTS (BTS#1) had previously received RLP packets with sequence numbers of 7, 8, and 9 from the BSC, and transmitted only the RLP packet with the sequence number of 7 to the MT. At the request of the BSC, the source BTS (BTS#1) then notifies the BSC that the sequence number of the RLP packet that was last transmitted to the MT is 7. After a handoff is performed, the target BTS transmits to the MT, RLP packets with sequence numbers of 8 or higher among previously received packets buffered therein.

If the BSC is notified through the BTSs that the MT has been handed off, the source BTS may directly transmit to the BSC the sequence notification message FVSHO_Sequence_Notification MSG for notifying the sequence number of the last transmitted RLP packet.

A format of the sequence retrieve message FVSHO_Sequence_Retrieve MSG transmitted from the BSC to the source BTS is identical to the message format illustrated in FIG. 12. However, the MSG_TYPE field and the CODE field are set to different values to distinguish this message from the transmission suspended message FVSHO_Suspend MSG.

Figure 16:
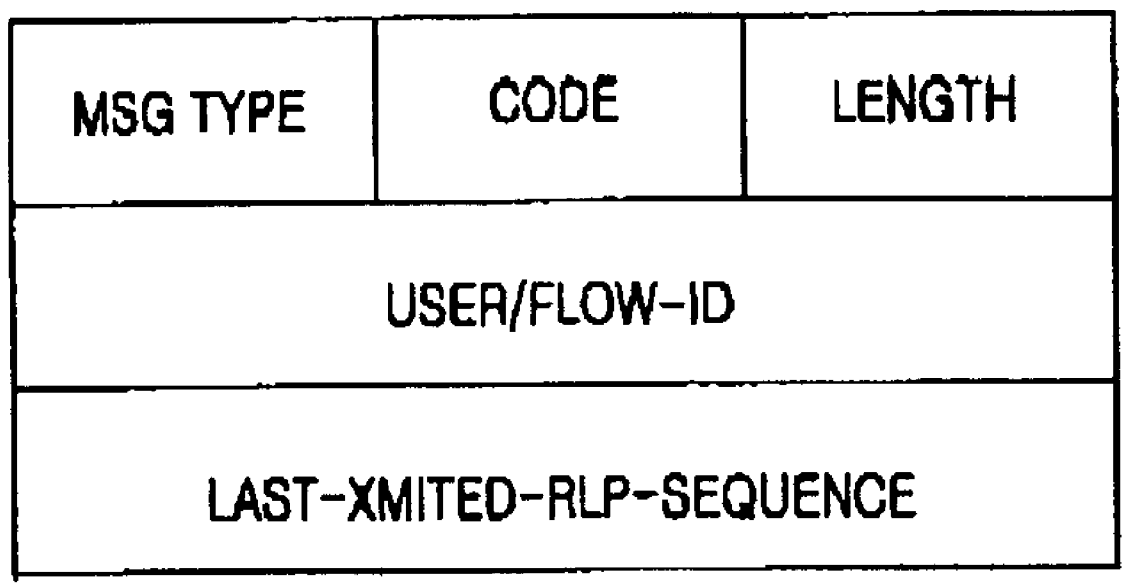
FIG. 16 illustrates a format of the sequence notification message transmitted from the source BTS to the BSC.

In addition, a format of the sequence notification message FVSHO_Sequence_Notification MSG transmitted from the source BTS to the BSC as a response message is illustrated in FIG. 16. As illustrated, the sequence notification message includes an MSG_TYPE field indicating the type of message, a CODE field including a control code, a LENGTH field indicating a length of the message, a USER/FLOW-ID field for identifying user or data flow, and a LAST-XMITED-RLP-SEQUENCE field indicating a sequence number of an RLP packet that was last transmitted to the MT.

Figure 17:
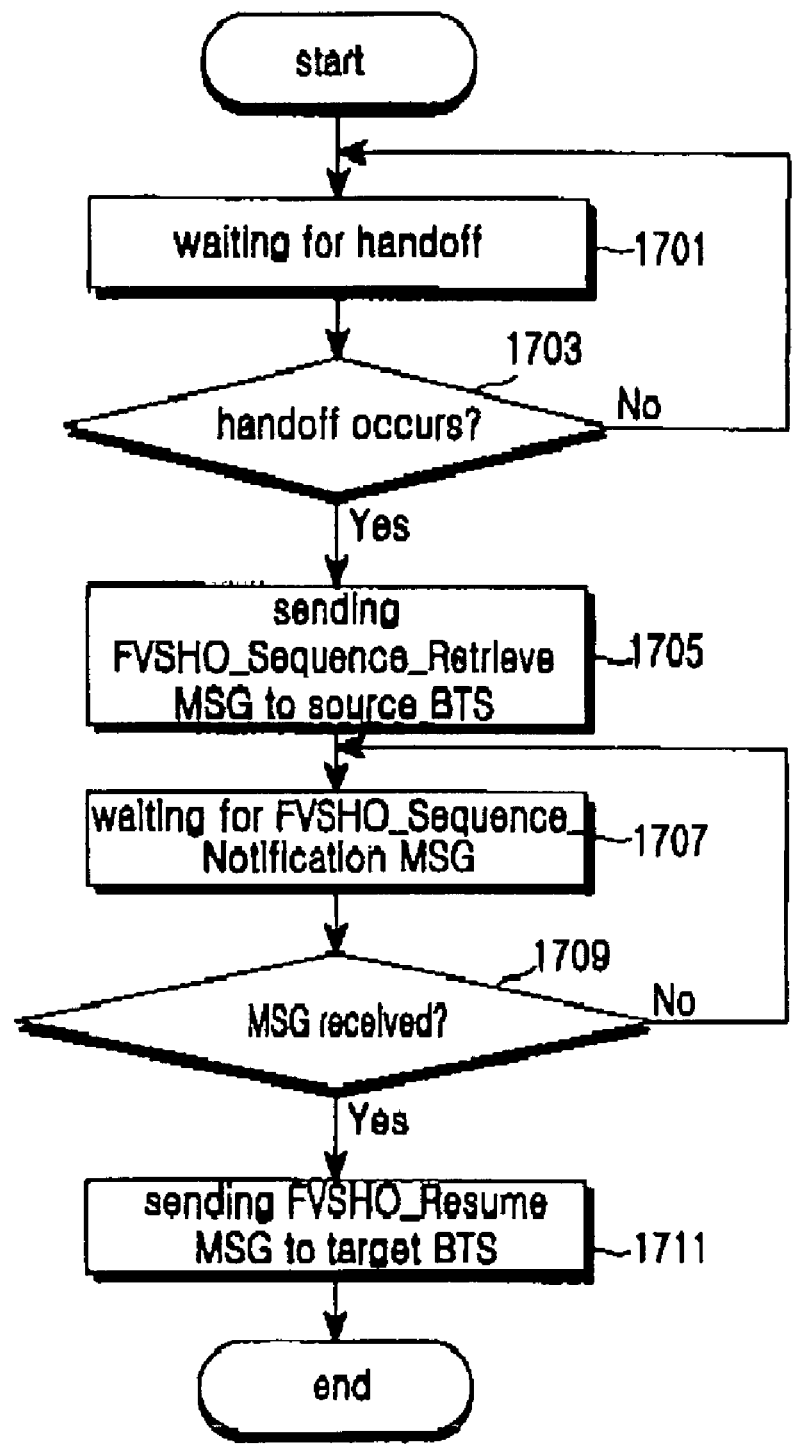
FIG. 17 is a flowchart illustrating a handoff procedure performed by the BSC according to an embodiment of the present invention.

FIG. 17 is a flowchart illustrating a handoff procedure performed by the BSC according to an embodiment of the present invention. Referring to FIG. 17, the BSC waits for a handoff in step 1701, and determines in step 1703 whether a handoff occurs. If a handoff does not occur, the BSC returns to step 1701 and waits for occurrence of a handoff. Otherwise, if a handoff occurs, the BSC transmits a sequence retrieve message FVSHO_Sequence_Retrieve MSG for retrieving a sequence number (i.e., the last sequence number) of an RLP packet that was last transmitted to the MT, to the source BTS in step 1705. Thereafter, the BSC waits for a response to the transmitted sequence retrieve message in step 1707, and determines whether a response message is received from the source BTS in step 1709. In step 1711, upon receiving a sequence notification message FVSHO_Sequence_Notification MSG with the last sequence number from the source BTS, the BSC extracts the last sequence number included in the sequence notification message, and transmits a resumption message FVSHO_Resume MSG with the extracted last sequence number to the target BTS in order to request the target BTS to resume transmission of packets buffered therein.

Figure 18:
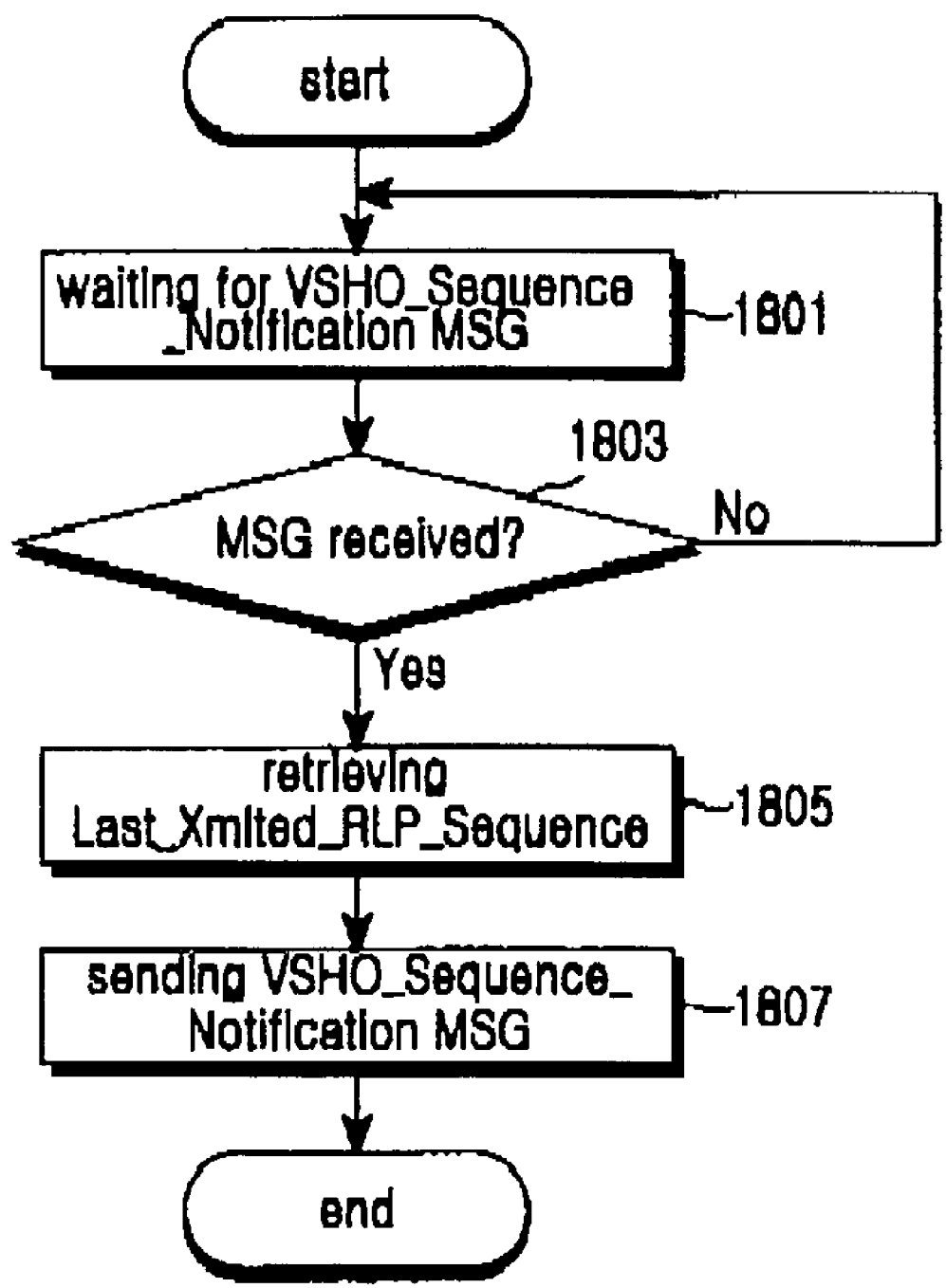
FIG. 18 is a flowchart illustrating a handoff procedure performed by the source BTS according to an embodiment of the present invention.

FIG. 18 is a flowchart illustrating a handoff procedure performed by the source BTS according to an embodiment of the present invention. Referring to FIG. 18, in step 1801, the source BTS waits for a sequence retrieve message FVSHO_Sequence_Retrieve MSG for retrieving a sequence number (i.e., the last sequence number) of the last transmitted RLP packet, from the BSC, and in step 1803, determines whether the sequence retrieve message is received. If the sequence retrieve message is received, the source BTS retrieves the sequence number of the last transmitted RLP packet from a predetermined memory area, in step 1805. Thereafter, in step 1807, the source BTS transmits a sequence notification message FVSHO_Sequence_Notification MSG with the retrieved last sequence number to the BSC.

The steps 1801 and 1803 illustrated in FIG. 18 are performed when the BSC detects a handoff of the MT by itself. As another example, the source BTS may directly notify the BSC of the last sequence number. In this case, the steps 1801 and 1803 are unnecessary. That is, if the source BTS receives a handoff request from the BSC or detects by itself that the MT enters a handoff region, then the source BTS notifies the BSC of a sequence number of the RLP that was last transmitted form the source BTS to the MT.

Figure 19:
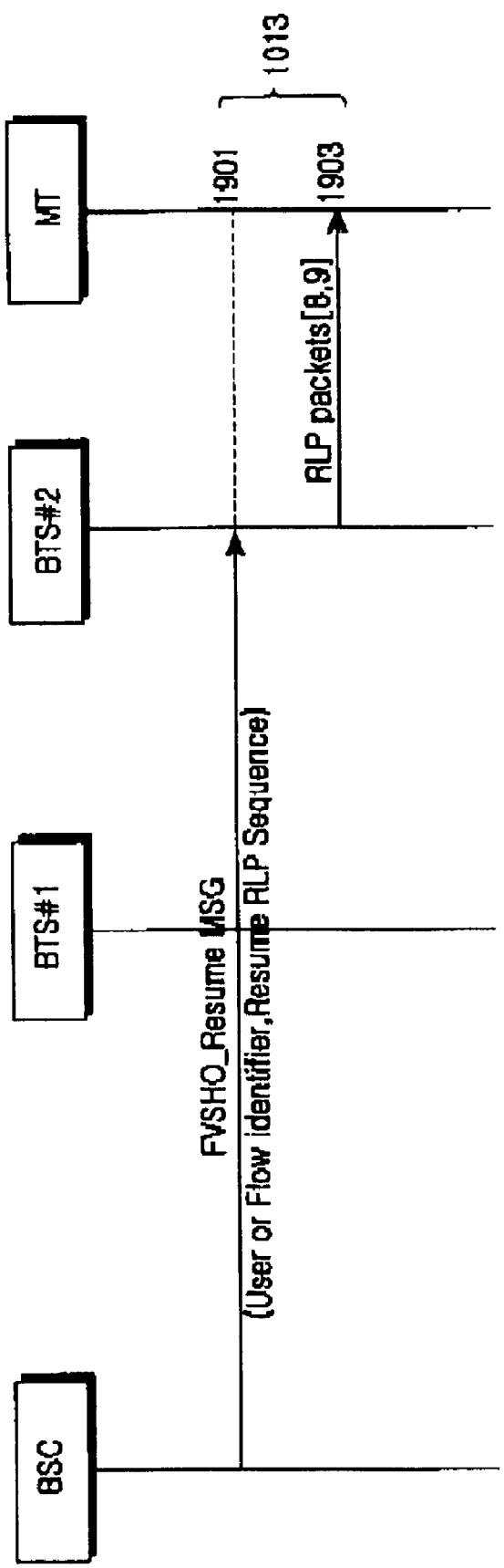
FIG. 19 illustrates a detailed description of the procedure performed in step 1013 of FIG. 10.

FIG. 19 illustrates a detailed description of the procedure performed in step 1013 of FIG. 10. In step 1013 a target BTS transmits RLP packets buffered therein to the MT.

Referring to FIG. 19, if the MT enters a service area of the target BTS, the BSC transmits to the target BTS the resumption message FVSHO_Resume MSG for requesting resumption of transmitting RLP packets with sequence numbers following the last sequence number in step 1901. In step 1903, the target BTS detects sequence numbers of the RLP packets stored in its internal buffer, discards previous RLP packets including the RLP packet with the last sequence number, and then resumes transmitting the next packets with sequence numbers following the last sequence number to the MT.

A format of the resumption message FVSHO_Resume MSG transmitted from the BSC to the target BTS is illustrated in FIG. 20. As illustrated, the resumption message includes an MSG_TYPE field indicating the type of message, a CODE field including a control code, a LENGTH field indicating a length of the message, a USER/FLOW-ID field for identifying a user or data flow, and a RESUME_RLP_SEQUENCE field indicating a sequence number of the RLP packet that was last transmitted to the MT.

Figure 21:
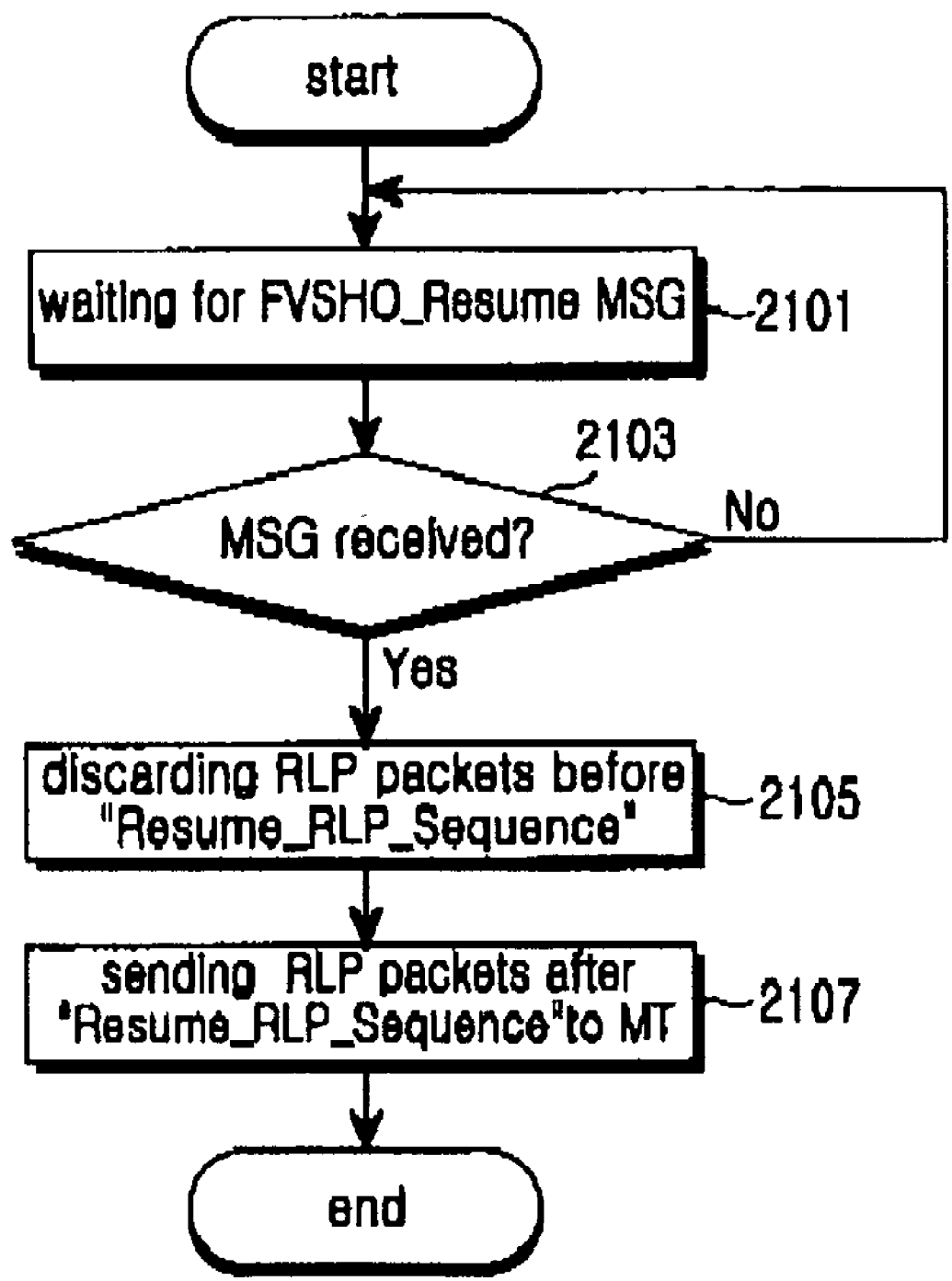
FIG. 21 is a flowchart illustrating a handoff procedure performed by the target BTS according to an embodiment of the present invention.

FIG. 21 is a flowchart illustrating the handoff procedure illustrated in FIG. 19 performed by the target BTS according to an embodiment of the present invention. Here, it will be assumed that the target BTS is registered as a candidate BTS for the MT, and has previously received and buffered RLP packets to be transmitted to the MT.

Referring to FIG. 21, in step 2101, the target BTS waits for a resumption message FVSHO_Resume MSG for requesting resumption of transmitting packets to the MT, and in step 2103, determines whether the resumption message is received from the BSC. If the resumption message is received, the target BTS extracts a last sequence number Resume_RLP_Sequence included in the resumption message, and discards all previous packets with the extracted last sequence number and its preceding sequence numbers, among the RLP packets previously received from the BSC in step 2105. Thereafter, in step 2107, the target BTS resumes transmitting the next RLP packets with sequence numbers following the last sequence number, to the MT.

Figure 22:
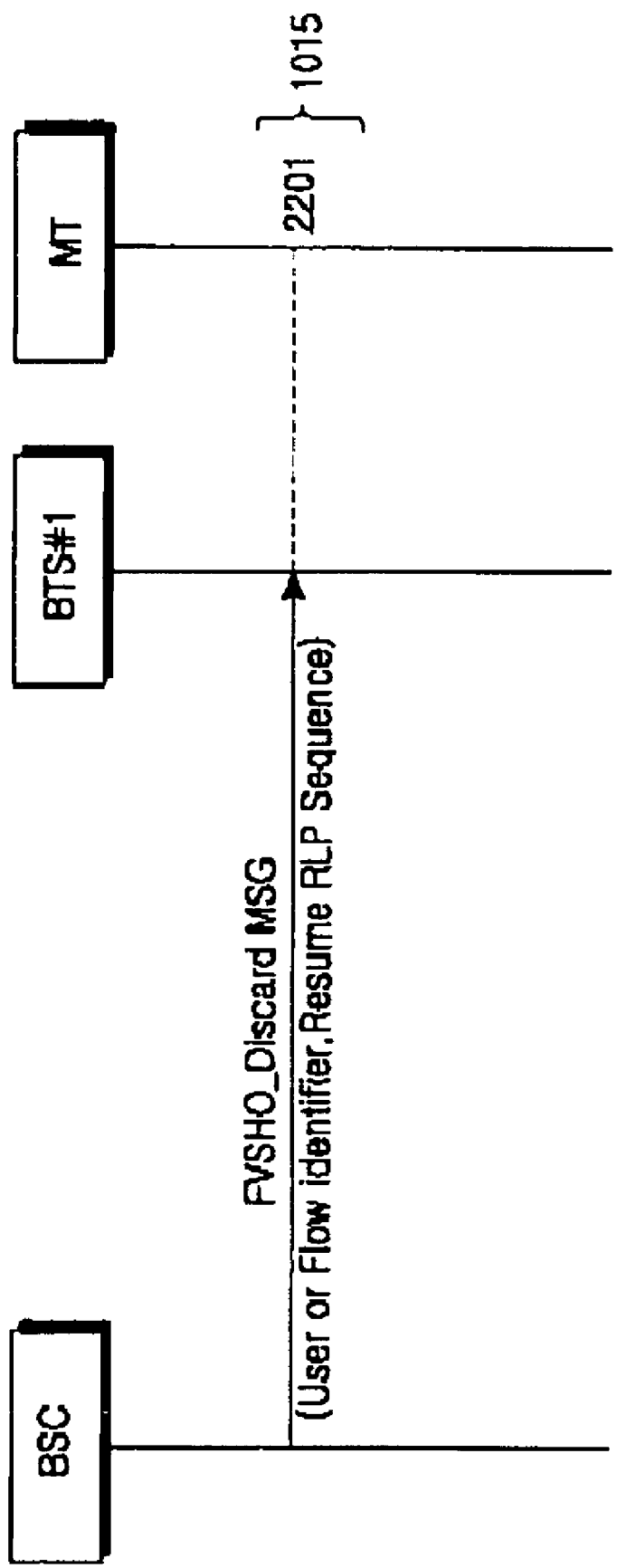
FIG. 22 illustrates a procedure for transmitting a discard message from the BSC to a dropped candidate BTS according to an embodiment of the present invention.

FIG. 22 illustrates a handoff procedure by a dropped candidate BTS (BTS#1) according to an embodiment of the present invention. Herein, it is assumed that the dropped candidate BTS (BTS#1) is dropped from the handoff candidate set, since it was registered as a handoff candidate BTS for a particular MT but the MT did not actually enter its service area.

Referring to FIG. 22, in step 2201, the BSC transmits to the dropped candidate BTS a discard message FVSHO_Discard MSG, requesting the dropped candidate BTS to discard RLP packets buffered therein. A format of the discard message FVSHO_Discard MSG transmitted from the BSC to the dropped candidate BTS (BTS#1) is illustrated in FIG. 23. As illustrated in FIG. 23, the discard message includes an MSG_TYPE field indicating the type of message, a CODE field including a control code, a LENGTH field indicating a length of the message, a USER/FLOW-ID field for identifying a user or data flow, and a DISCARD_TO_LAST_RLP_SEQUENCE field indicating the last sequence number which becomes a criterion for discarding packets.

Figure 24:
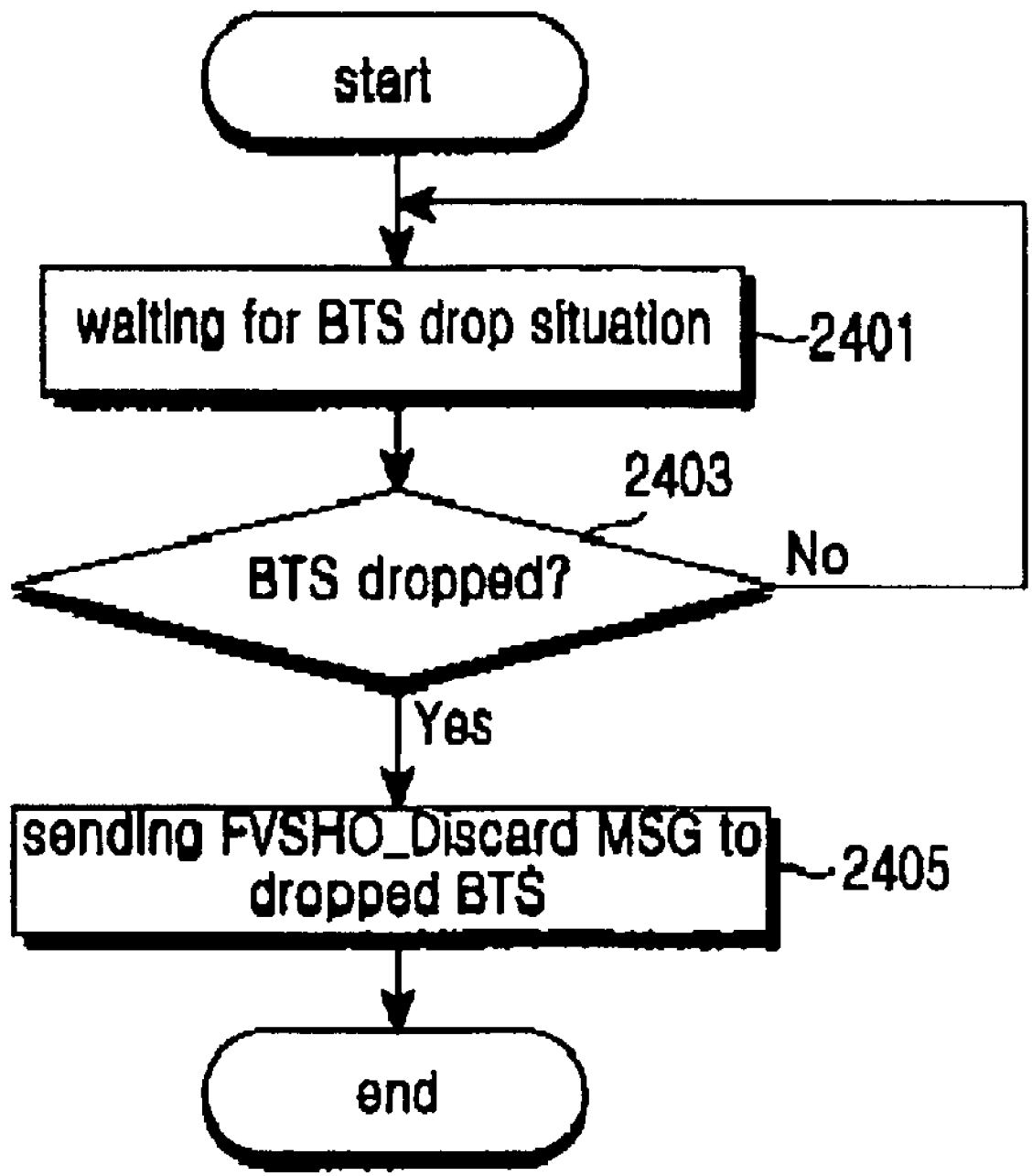
FIG. 24 is a flowchart illustrating the handoff procedure illustrated in FIG. 22 performed by the BSC according to an embodiment of the present invention.

FIG. 24 is a flowchart illustrating the handoff procedure illustrated in FIG. 22 performed by the BSC according to an embodiment of the present invention. Referring to FIG. 24, the BSC checks drop situations of individual BTSs registered in a handoff candidate set for MT in step 2401, and determines in step 2403 whether the handoff candidate BTSs include a dropped candidate BTS. If a candidate BTS dropped from the handoff candidate set is detected, the BSC transmits to the dropped candidate BTS a discard message FVSHO_Discard MSG for requesting the dropped candidate BTS to discard RLP packets buffered therein in step 2405.

Here, if it is determined that there is little probability that the dropped candidate BTS will resume communication with the MT, the BSC sets the DISCARD_TO_LAST_RLP_SEQUENCE field of the discard message to a prescribed value instead of a sequence number in order to request the dropped candidate BTS to discard all RLP packets buffered therein. Otherwise, the BSC sets the DISCARD_TO_LAST_RLP_SEQUENCE field of the discard message to the last sequence number in order to request the dropped candidate BTS to discard the next RLP packets with sequence numbers following the last sequence number.

Figure 25:
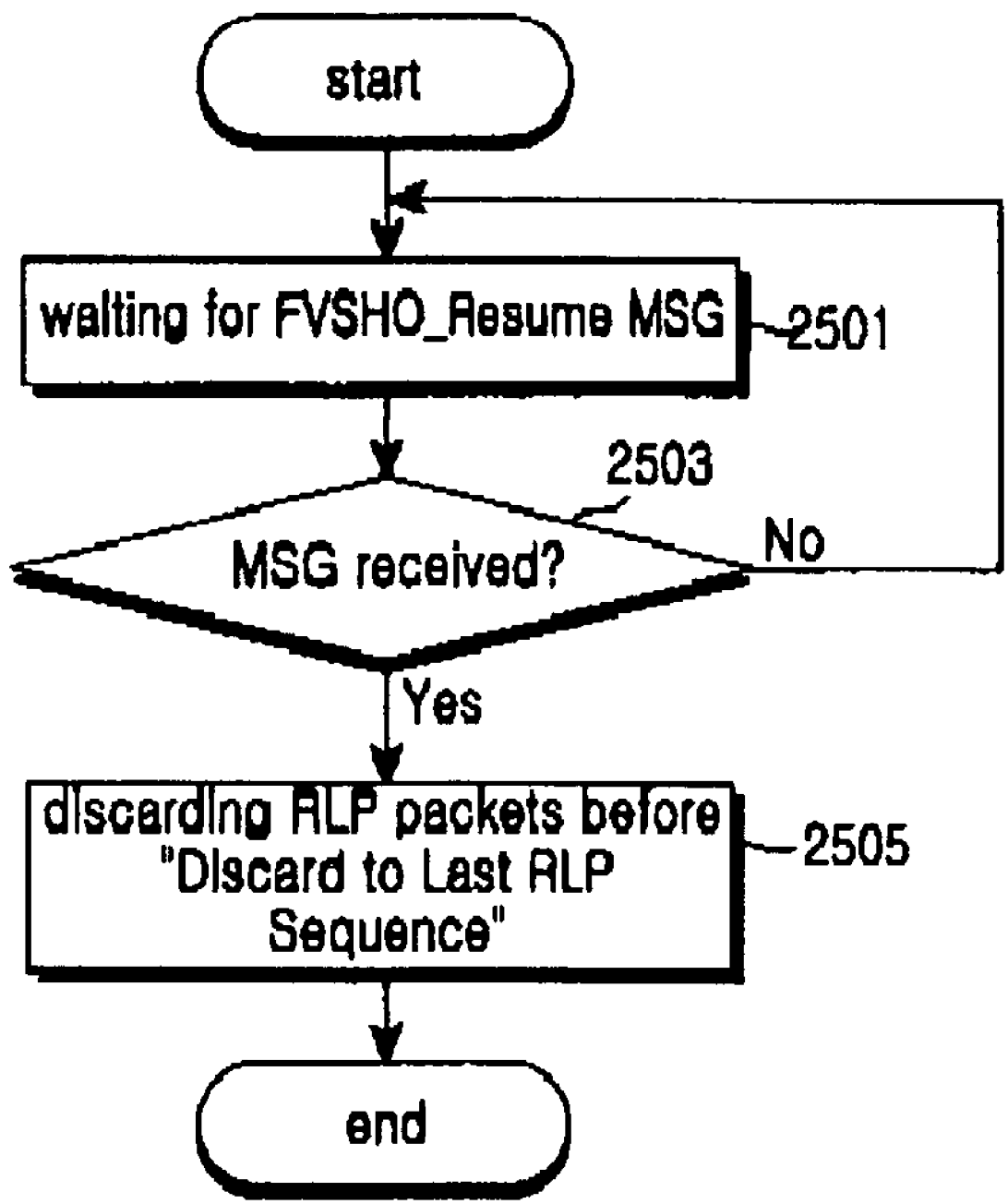
FIG. 25 is a flowchart illustrating the handoff procedure illustrated in FIG. 22 performed by the dropped candidate BTS according to an embodiment of the present invention.

FIG. 25 is a flowchart illustrating a handoff procedure performed by the dropped candidate BTS according to an embodiment of the present invention. Referring to FIG. 25, the dropped candidate BTS waits for a discard message FVSHO_Discard MSG for requesting discard of buffered RLP packets in step 2501, and in step 2503, determines whether the discard message is received from the BSC. In step 2505, if the discard message is received, the dropped candidate BTS discards RLP packets with sequence numbers up to the last sequence number included in the discard message, among the RLP packets buffered therein. If the DISCARD_TO_LAST_RLP_SEQUENCE field of the discard message is not set to the last sequence number, i.e., set to an invalid value (e.g., −1), then the dropped candidate BTS discards all the buffered RLP packets.

A summary of the overall handoff operation according to the present invention will be made herein below.

As an MT being serviced by a source BTS moves toward a service area of a target BTS, the target BTS is selected as a serving BTS for the MT. The BSC then transmits RLP packets (data traffic) to be transmitted to the MT to both the source BTS and the target BTS. In this case, the BSC transmits to the target BTS a transmission suspended message, FVSHO_Suspend MSG for requesting the target BTS to buffer the transmission RLP packets. Therefore, the target BTS buffers the RLP packets to be transmitted to the MT in its internal buffer.

If the target BTS is determined as a serving BTS for the MT as the MT completely enters the service area of the target BTS, the BSC transmits to the source BTS a sequence retrieve message, FVSHO_Sequence_Retrieve MSG for retrieving the last sequence number of the RLP packet last transmitted to the MT. In response to the sequence retrieve message, the source BTS transmits to the BSC a sequence notification message, FVSHO_Sequence_Notification MSG indicating the last sequence number.

Upon receiving the sequence notification message from the source BTS, the BSC extracts a last sequence number from the received sequence notification message, and transmits a resume message FVSHO_Resume MSG with the extracted last sequence number to the target BTS in order to request the target BTS to transmit RLP packets buffered therein to the MT. The target BTS then extracts a last sequence number included in the resume message, discards previous RLP packets with sequence numbers below the last sequence number, and transmits the remaining RLP packets to the MT. In addition, the BSC eliminates the source BTS from an active set for the MT, and transmits RLP packets for the MT only to the target BTS, completing the handoff procedure.

Meanwhile, the BSC transmits a discard message FVSHO_Discard MSG to the source BTS and the candidate BTSs dropped from the handoff candidate set, in order to discard the RLP packets buffered in the above BTSs. Here, if it is determined that there is little probability that the dropped candidate BTS will resume communication with the MT, the BSC requests the dropped candidate BTS to discard all RLP packets buffered therein. Otherwise, the BSC requests the dropped candidate BTS to discard only the RLP packets with sequence numbers below the last sequence number.

As described above, a mobile communication system according to the present invention improves call quality by minimizing a processing delay time caused by a handoff. That is, data traffic is previously transmitted to an expected handoff target BTS, so that the handoff target BTS can immediately resume transmission of data packets to MT when the MT enters a service area of the handoff target BTS.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for performing a handoff of a mobile terminal (MT) moving between cells of base transceiver stations (BTSs) in a mobile communication system including a plurality of BTSs, and a base station controller (BSC), the method comprising the steps of:

if a target BTS is selected as a handoff candidate for the MT as the MT moves from a cell of a source BTS in service toward the target BTS, transmitting from the BSC a first message for requesting the target BTS to buffer packets, and transmitting packets to be transmitted to the MT to both the source BTS and the target BTS;

upon receiving the first message in the target BTS, buffering packets received from the BSC;

if the target BTS is determined as a serving BTS for the MT, transmitting from the BSC a second message for retrieving a last sequence number of a last packet transmitted to the MT, to the source BTS;

transmitting from the source BTS a third message including the last sequence number to the BSC, in response to the second message;

transmitting from the BSC a fourth message including the last sequence number acquired from the third message, to the target BTS; and transmitting packets with sequence numbers higher than the last sequence number to the MT.

2. The method of claim 1, further comprising the step of, if the target BTS is dropped from a handoff candidate set for the MT, transmitting the fourth message from the BSC to the target BTS, requesting the target BTS to discard the buffered packets.

3. The method of claim 2, wherein the fourth message includes the last sequence number in order to request the target BTS to discard packets with sequence numbers below the last sequence number among the buffered packets.

4. The method of claim 2, wherein the target BTS determines whether the fourth message includes the last sequence number of the packet that was last transmitted from the source BTS to the MT, and if the fourth message does not include the last sequence number, the target BTS discards all the buffered packets.

* * * * *